Oct. 5, 1971          V. A. PULLOS          3,609,825
UNDERWATER RELEASE
Filed Jan. 21, 1969
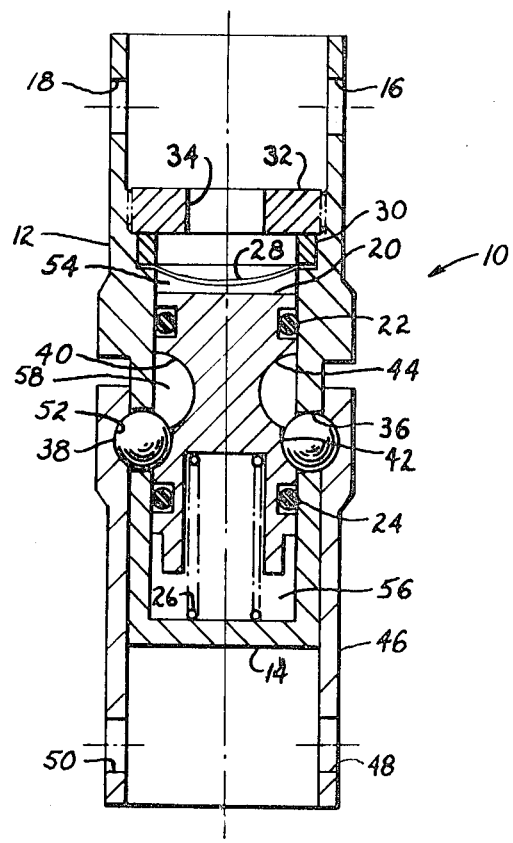
VLASH A. PULLOS
INVENTOR.
BY *Andrew M. Pullos*

United States Patent Office 3,609,825
Patented Oct. 5, 1971

3,609,825
UNDERWATER RELEASE
Vlash A. Pullos, 1441 S. Loara, Anaheim, Calif. 92125
Filed Jan. 21, 1969, Ser. No. 792,305
Int. Cl. A44b 17/00
U.S. Cl. 24—211 N
5 Claims

ABSTRACT OF THE DISCLOSURE

The disclosed embodiment of the present invention is a release device which is generally formed of a cylindrical housing having an open end and a closed end, a piston mounted for axial movement in the housing, a rupturable seal across the open end of the housing, a sleeve extending over the closed end of the housing, and releasable retaining balls extending through respective apertures in the housing and engageable with respective grooves in the piston and the sleeve. A pair of seals on the piston form a first closed chamber at the closed end of the housing and a second closed chamber with the rupturable seal at the open end of the housing. The intermediate portion of the piston includes a groove for receiving the retaining balls therein, which groove includes two adjacent lands. One land has a diameter which forces the retaining balls into engagement with the groove in the sleeve and the other land has a diameter which permits the retaining balls to disengage from the groove in the sleeve.

---

This invention relates generally to release mechanisms and more particularly to a pressure differential responsive apparatus which is actuatable to permit the release of a member or object therefrom. The apparatus of the present invention has particular application in underwater technology when the potential energy of an object is transformed into kinetic energy by virtue of its descent through the water to a level of greater ambient pressure and such greater ambient pressure is utilized to perform work. However, it is to be understood that the principles of the present invention have application in other fields and accordingly this invention is not limited to underwater applications.

It is desirable in various underwater operations to have some means for performing useful work which is programmed to the ambient pressure. For example, it may be desirable to release ballast from an underwater vehicle to increase the buoyancy of the vehicle and to permit the vehicle to rise to a higher level in the body of water. In a like manner, it may be desirable to release a member having a relatively high buoyancy from an underwater vehicle to descend to a lower level in the body of water. In general, any type of device or material can be released from an underwater vehicle if useful work can be performed in response to the ambient pressure on the vehicle. The device to be released however, need not to be associated with the buoyancy of the underwater vehicle and, for example, other types of devices may be released, such as an instrument package of either equal, greater, or lesser buoyancy than the underwater vehicle.

Devices for performing useful work in response to a predetermined level of ambient pressure are old in the art, per se, but such devices are relatively complicated, requiring a relatively large number of components. One of the major limitations of some of the prior known devices is that they depend upon a difference between two sealing areas to produce motion and useful work. Consequently, the force produced by such devices is limited to the difference between the two sealing areas. Therefore, if a relatively large force is required of such prior known devices, a relatively large sealing area is required at one end of the actuating member as opposed to the sealing area at the other end of the actuating member.

It is, therefore, an object of the present invention to provide an actuator which is responsive to a predetermined level of ambient pressure to develop a force and produce work to effect release of a member therefrom.

Another object of the present invention is to provide an actuator having a configuration which permits the development of a maximum amount of force to produce useful work.

These and other objects are realized by the present invention which generally includes a cylindrical housing having an open end and a closed end, a piston mounted in the housing, a sleeve extending over the closed end of the housing, and disposed for slidable movement along the longitudinal axis thereof, and locking means extending through the walls of the housing between the piston and the sleeve for restricting movement of the sleeve along the longitudinal axis. The piston is disposed for disabling the locking means in response to movement thereof along the longitudinal axis of the housing under influence of a pressure exerted at the one end thereof upon the occurrence of a rupture in the seal, which pressure is greater than the pressure exerted at the other end of the piston.

A feature of the present invention resides in the provision of a pair of sealing members disposed between the piston and the housing which provide a pair of sealed chambers; one of which is formed between one of the seals at one end of the piston and the rupturable disc, and the other of which is formed by the other of the seals between the other end of the piston and the closed end of the housing. In accordance with the principles of the present invention, the intermediate portion of the piston between the two seals is exposed to ambient pressure such that the piston is pressure balanced within the housing until the rupturable disc is ruptured to permit ambient pressure to be applied to the corresponding end of the piston.

Other objects, features and advantages of the present invention will be more fully realized and understood from the following detailed description when taken in conjunction with the accompanying drawing wherein the single figure is a sectional view of the preferred embodiment of the invention constructed in accordance with the principles of the present invention.

With reference to the drawing in detail, there is shown a preferred embodiment of the present invention which is generally formed of a main body portion, generally designated with the reference number 10, which is disposed for being secured to an underwater vehicle and the like. The main body portion 10 is formed of a housing 12 which is preferably cylindrically shaped. The housing 12 is closed by means of a wall 14 at one end thereof. The other end of the housing 12 is open and a pair of bolt holes 16 and 18 are provided in opposite walls thereof for facilitating attachment to an underwater vehicle or the like.

A piston 20 is mounted within the housing 12, which piston is provided with a pair of seal grooves at opposite ends thereof adapted to receive seals 22 and 24 therein. A spring 26 biases the piston 20 away from the closed end of the housing 12 formed by the wall 14. A rupturable disc 28 is mounted across the open end of the housing 12 and is secured thereto by means of a hold down ring 30 which engages the peripheral edges of the disc 28 against a shoulder formed in the housing 12. A nut 32 is threadably engaged with interior threads within the housing 12 and bears against the hold down ring 30. The nut 32 is provided with a central aperture 34 which exposes the rupturable disc 28 to ambient pressure.

A plurality of apertures 36 are provided in the wall of the housing 12 and are disposed for receiving retaining balls 38 therein. The piston 20 is provided with a groove 40 extending around the periphery thereof which is formed of a first land 42 and a second land 44 immediately adjacent one another. The diameter of the land 42 is slightly less than the diameter of the piston 20 and the diameter of the land 44 is slightly less than the diameter of the land 42. The respective diameters of the lands 42 and 44, however, are related to the diameter of the retaining balls 38 and the amount of the movement required of such retaining balls to permit a proper release to occur as will be explained more fully hereinbelow.

A sleeve 46 having an inside surface conformably shaped to the external surface of one end of the housing 12 is mounted over the closed end of the housing 12. The sleeve 46 includes a pair of bolt holes 48 and 50 in opposite walls thereof which provide means for securing the sleeve to an object which is to be released. The sleeve 46 is provided with a groove 52 in an internal surface thereof which is disposed for receiving and being engaged by the retaining balls 38. It can now be readily appreciated that the land 42 must have a diameter which is sufficient to maintain the retaining balls 38 in engagement with the groove 52 in the sleeve 46. In addition, it can be appreciated that the land 44 of the groove 40 must have a diameter which is sufficient to permit the retaining balls 38 to be withdrawn from the groove 52 to permit release of the sleeve 46 from the housing 12.

A closed chamber 54 is formed by means of the seal 22 and the rupturable disc 28, which closed chamber is at approximately one atmosphere pressure. A second closed chamber 56 is formed by means of the seal 24 and the closed end of the housing 12, which closed chamber is at one atmosphere pressure. The pressure within the chambers 54 and 56 is determined by the ambient pressure at the time of assembly. Therefore, the pressure in the chamber 54 will be equal to the pressure in the chamber 56. A third chamber 58 is formed between the two seals 22 and 24, which chamber is subjected to ambient pressure, since there is no seal provided between the chamber 58 and the external surroundings.

The release of the present invention operates at a predetermined depth which is related to the burst pressure of the rupturable disc 28. As the release device is lowered in a body of water, the water will enter and pressurize the chamber 58. Before the rupturable disc 28 fails, however, the closed chambers 54 and 56 are approximately at one atmosphere pressure. Consequently, the piston 20 is pressure balanced and will, therefore, not move within the housing 12. In order to further insure that the piston 20 will not move until the rupturable disc 28 fails, the spring 26 biases the piston 20 in a direction to maintain the retaining balls 38 locked into position in the groove 52.

When the release device has descended to the predetermined depth, the rupturable disc 28 fails and ambient pressure at that level within the body of water is exerted against one end of the piston 20 and against the seal 22. Since no pressure differential exists across the seal 22 after the rupturable disc 28 has failed and since a pressure differential does exist across the seal 24, the piston 20 will move toward the wall 14 of the housing 12. Movement of the piston 20 toward the end wall 14 translates the land 44 to a position which permits the retaining balls 38 to be received therein. Consequently, the retaining balls 38 will be removed from the groove 52 and the sleeve 46 will be released from the housing 12.

It can now be readily appreciated that the force developed on the piston 20 upon failure of the rupturable disc 28 is dependent only upon the sealing area of the seal 24. Consequently, a maximum force can be developed to translate the piston 20 within the housing 12 to release the sleeve 46 therefrom. In addition, the release of the present invention is of relatively simple construction requiring relatively few parts, thereby operating with a maximum amount of efficiency to produce useful work in response to an increase in the ambient pressure.

It is to be understood that various modifications can be made without departing from the spirit and scope of the present invention. For example, the rupturable disc 28 can be replaced with a pyrotechnic loaded rupturable disc. In addition, it can be readily appreciated that the rupturable disc 28 can be replaced with a pyrotechnic gas generator which would be employed to create a pressurized gas within the chamber 54. Furthermore, the rupturable disc 28 can be replaced with a valve, such as a solenoid operated valve or a hand operated valve.

Additionally, the rupturable disc 28 can be pierced by a striker, rather than relying on the pressure exerted thereon by water. If such a striker is employed, it can be spring loaded and actuated by a clock or timer. Consequently, an underwater vehicle can be dropped on the ocean bottom and remain there for any period of time before the rupturable disc 28 is pierced. Various materials, such as magnesium, react with salt water (electrolytic corrosion). Therefore, it would be feasible to employ a link made of such a material as a time delay element. Corrosion of the link would release the spring loaded striker to pierce the rupturable disc 28.

It is to be understood that the disclosed exemplification of the present invention is simply illustrative of the application of the principles of the invention. Numerous other arrangements may be devised by those skilled in the art which will embody the principles of the invention and fall within the spirit and scope thereof.

The invention claimed is:
1. A release device for releasing an object upon the occurrence of a condition, comprising
  (a) a housing,
  (b) a piston movable within said housing,
  (c) a pair of seals each transposed between said piston and said housing and each forming approximately equal sealing areas, said seals further forming a first closed chamber between one end of said piston and a wall of said housing and a second closed chamber at the other end of said piston, said piston being movable into said first closed chamber,
  (d) means responsive to the occurrence of said condition for applying a pressure greater than the pressure in said closed chamber to the other end of said piston.
  (e) locking means for securing the object to said housing and including a member positioned between said seals and extending through an aperture in said housing, and
  (f) means responsive to the movement of said piston into said first chamber for disabling said locking means.

2. A release device, comprising
  (a) a cylindrical housing having an open end and a closed end,
  (b) a piston mounted in said housing for slidable movement along the longitudinal axis thereof,
  (c) first sealing means disposed between an intermediate portion of said piston and one end of said piston for forming a closed chamber between the one end of said piston and the closed end of said housing,
  (d) means closing the open end of said housing and responsive to a predetermined condition for applying a pressure greater than the pressure in said closed chamber to the other end of said piston,
  (e) second sealing means disposed between the intermediate portion of said piston and the other end of said piston,
  (f) a sleeve extending over the closed end of said housing and disposed for slidable movement thereon along the longitudinal axis,
  (g) locking means extending through a wall of said housing between the intermediate portion of said piston and said sleeve for restricting movement of said sleeve along the longitudinal axis, said piston having a means for disabling said locking means in response to movement of said piston along the longitudinal axis under influence of a pressure exerted at the other end thereof which is greater than the pressure exerted at the one end thereof.

3. A release device as defined in claim 1, wherein said housing is cylindrically shaped and is closed at one end thereof and open at the other end thereof, said piston is cylindrically shaped and is movable axially within said housing from a first position to a second position, said seals being spaced axially from the aperture in said housing and on opposite sides thereof in both said first and said second positions of said piston, said member comprising a retaining ball positioned in the aperture and disposed for engaging an indentation on the object to be released, said piston being disposed in said first position thereof for restricting said retaining ball from movement out of the indentation on the object, said disabling means including an indentation on said piston which is positioned to receive said retaining ball in the second position of said piston to permit release of the object.

4. A release device for releasing an object upon the occurrence of a condition, comprising
(a) a housing,
(b) a piston movable within said housing,
(c) means forming a first closed chamber between one end of said piston and a wall of said housing and a second closed chamber at the other end of said piston, said piston being movable into said first closed chamber, said first and second chambers being pressurized at approximately one atmosphere pressure, said forming means including a rupturable disk forming a barrier between external surroundings and said second chamber and responsive to the occurrence of said condition for applying a pressure greater than the pressure in said first closed chamber to the other end of said piston,
(d) locking means for securing the object to said housing, said forming means further including a pair of seals interposed between said housing and mounted on opposite sides of said locking means, said locking means being exposed to ambient pressure such that a pressure differential exists across each of said seals, the sealing areas of said seals being approximately equal to effect a pressure balance condition on said piston to retain said piston in a first position, whereby failure of said disk results in the pressure in said second chamber being raised to ambient thereby translating said piston to a second position in said first chamber, and
(e) means responsive to the movement of said piston into said first chamber for disabling said locking means.

5. A release device as defined in claim 4, wherein said locking means includes a member having a first and a second position, said member being engageable with the object in the first position thereof and being disengaged from the object in the second position thereof, said piston including a first surface for retaining said member in the first position thereof, said disabling means including a second surface on said piston for receiving said member in a second position of said piston and having a dimension to permit movement of said member to the second position thereof.

References Cited

UNITED STATES PATENTS

| | | | |
|---|---|---|---|
| 2,848,014 | 8/1958 | Tennis | 137—624.27 |
| 2,959,129 | 11/1960 | Warren | 294—83 X |
| 3,087,697 | 4/1963 | Potts, Jr. | 294—83 X |
| 3,107,938 | 10/1963 | Schick et al. | 294—83 |
| 3,228,080 | 1/1966 | Tranger | 24—230 |
| 3,245,346 | 4/1966 | Schuetzler | 294—83 X |
| 3,386,138 | 6/1968 | Overman | 24—211 |

STANLEY N. GILREATH, Primary Examiner

W. H. SCHROEDER, Assistant Examiner

U.S. Cl. X.R.

137—68; 294—83 AA